(12) United States Patent
Allen et al.

(10) Patent No.: US 7,821,898 B2
(45) Date of Patent: Oct. 26, 2010

(54) TECHNIQUES TO STORE AND ACCESS INFORMATION USING A HOLOGRAPHIC MEDIUM

(75) Inventors: Jorge Allen, Albuquerque, NM (US); Ajith Illendula, Albuquerque, NM (US); Jim Baca, Corrales, NM (US); John Colang, Placitas, NM (US); Michael Speer, Jr., Placitas, NM (US)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 11/608,712

(22) Filed: Dec. 8, 2006

(65) Prior Publication Data

US 2008/0137511 A1    Jun. 12, 2008

(51) Int. Cl.
*G11B 7/00* (2006.01)
(52) U.S. Cl. ...................................... 369/103
(58) Field of Classification Search .................. None
See application file for complete search history.

(56) References Cited

U.S. PATENT DOCUMENTS

| | | |
|---|---|---|
| 5,377,176 A | 12/1994 | Redfield |
| 5,377,179 A | 12/1994 | Redfield |
| 5,416,616 A * | 5/1995 | Jenkins et al. ............... 359/11 |
| 5,477,347 A | 12/1995 | Redfield et al. |
| 5,481,523 A | 1/1996 | Dewald |
| 5,488,494 A | 1/1996 | Redfield et al. |
| 5,511,058 A | 4/1996 | Visel et al. |
| 5,519,517 A | 5/1996 | Redfield et al. |
| 5,519,651 A | 5/1996 | Redfield |
| 5,526,337 A | 6/1996 | Housey et al. |
| 5,529,861 A | 6/1996 | Redfield |
| 5,566,387 A | 10/1996 | Dewald |
| 5,621,549 A | 4/1997 | Redfield |
| 5,627,664 A | 5/1997 | Trisnadi |
| 5,638,193 A | 6/1997 | Trisnadi et al. |
| 5,665,791 A | 9/1997 | Lee et al. |
| 5,694,488 A | 12/1997 | Hartmann |
| 5,696,613 A | 12/1997 | Redfield et al. |
| 5,756,648 A | 5/1998 | Lee |
| 5,883,880 A | 3/1999 | Lee |
| 5,896,210 A | 4/1999 | Redfield et al. |

(Continued)

FOREIGN PATENT DOCUMENTS

JP        09223049 A  *  8/1997

(Continued)

OTHER PUBLICATIONS

Someno, WO 2005/114336 A1, published Dec. 1, 2005.*

(Continued)

*Primary Examiner*—Peter Vincent Agustin
(74) *Attorney, Agent, or Firm*—Caven & Aghevli LLC (57) ABSTRACT

Techniques are described that can be used to store information onto a holographic storage medium. Techniques are described that can be used to access information from a holographic storage medium. Multiple beam sources and multiple detectors can be used to store and/or read information. At least one detector can be available to read information available from a beam reflected from the medium. Multiple read and/or write operations may take place at substantially the same time.

17 Claims, 5 Drawing Sheets

U.S. PATENT DOCUMENTS

| | | | |
|---|---|---|---|
| 5,940,537 A | 8/1999 | Regen et al. | |
| 5,978,112 A * | 11/1999 | Psaltis et al. | 359/22 |
| 6,473,208 B1 * | 10/2002 | Lee et al. | 359/1 |
| 6,995,882 B2 * | 2/2006 | Horimai | 359/2 |
| 2004/0208108 A1 * | 10/2004 | McNiece | 369/103 |
| 2007/0223073 A1 * | 9/2007 | Someno | 359/15 |

FOREIGN PATENT DOCUMENTS

| | | |
|---|---|---|
| JP | 36-052338 | 5/2005 |
| JP | 2005-172956 | 6/2005 |
| JP | 2005-331865 | 12/2005 |
| JP | 2006-162661 | 6/2006 |
| KR | 100213041 | 8/1999 |

OTHER PUBLICATIONS

"International Search Report and Written Opinion", PCT/US2007/082915, (Apr. 28, 2008), 12 Pages.

InPhase Technologies, Technology Tour, 5 pages.

* cited by examiner

PRIOR ART

TECHNIQUES TO STORE AND ACCESS INFORMATION USING A HOLOGRAPHIC MEDIUM

FIELD

The subject matter disclosed herein relates to techniques to store and access information using a holographic medium.

RELATED ART

Figure 1:
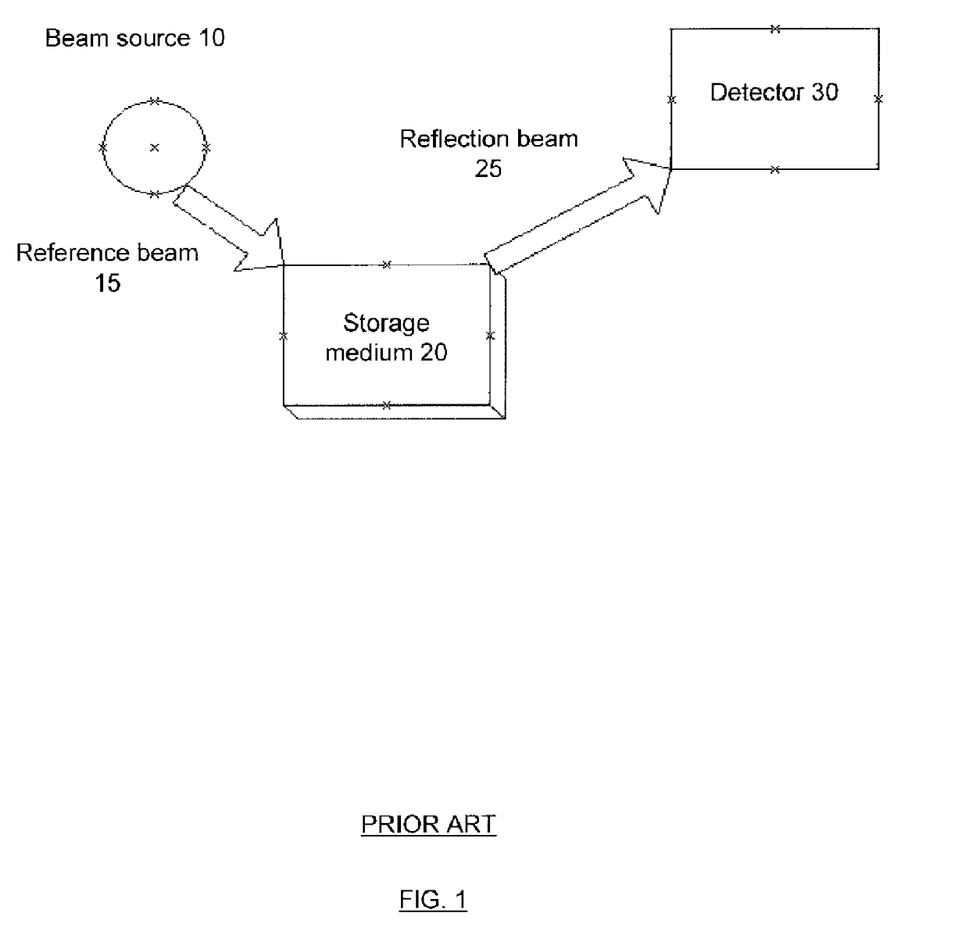
FIG. 1 depicts an example of a prior art holographic storage device in block diagram form.

Data storage needs are ever increasing. Many techniques are known to store data such as magnetic disk, compact disc, and non-volatile memory. Data storage using holographic storage techniques is evolving. For example, FIG. 1 depicts an example of a prior art holographic storage device in block diagram form. Storage medium 20 is capable to store a pattern. To write information to storage medium 20, beam source 10 emits a reference beam towards a region of storage medium 20. The reference beam includes properties of information to be written to storage medium 20. Storage medium 20 stores a pattern whose properties are based on properties of the reference beam. To read information from the storage medium, a beam source emits a reference beam towards a region of the pattern. Reflection beam 25 is the reflection of the reference beam from the region. Information stored by the region influence properties of reflection beam 25. Detector 30 detects reflection beam 25 and extracts stored information from reflection beam 25. Detector 30 translates dark and bright spots from reflection beam 25 into stored information. It is desirable to increase the rate at which data can be written to and read from a holographic storage medium.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Current storage devices are known to perform read and/or write operations in a serial manner such that a first read/write completes (i.e., information is read-from/written-to the medium and available in electronic form) prior to another read/write operation commencing. Current holographic storages rely on technology to rotate the medium so that a portion on the medium that is to be read-from/written-to is placed in the correct angle relative to a light emitter and a light detector.

Some embodiments of the present invention may reduce or eliminate use of spinning technology at least by use of multiple light emitters and multiple light sensors positioned around the medium. Use of multiple light emitters and light sensors around the medium may reduce or eliminate rotating the medium in order to read from or write to another location. Some embodiments of the present invention may provide for one or more read and/or write operations that take place overlapping in time.

Figure 2:
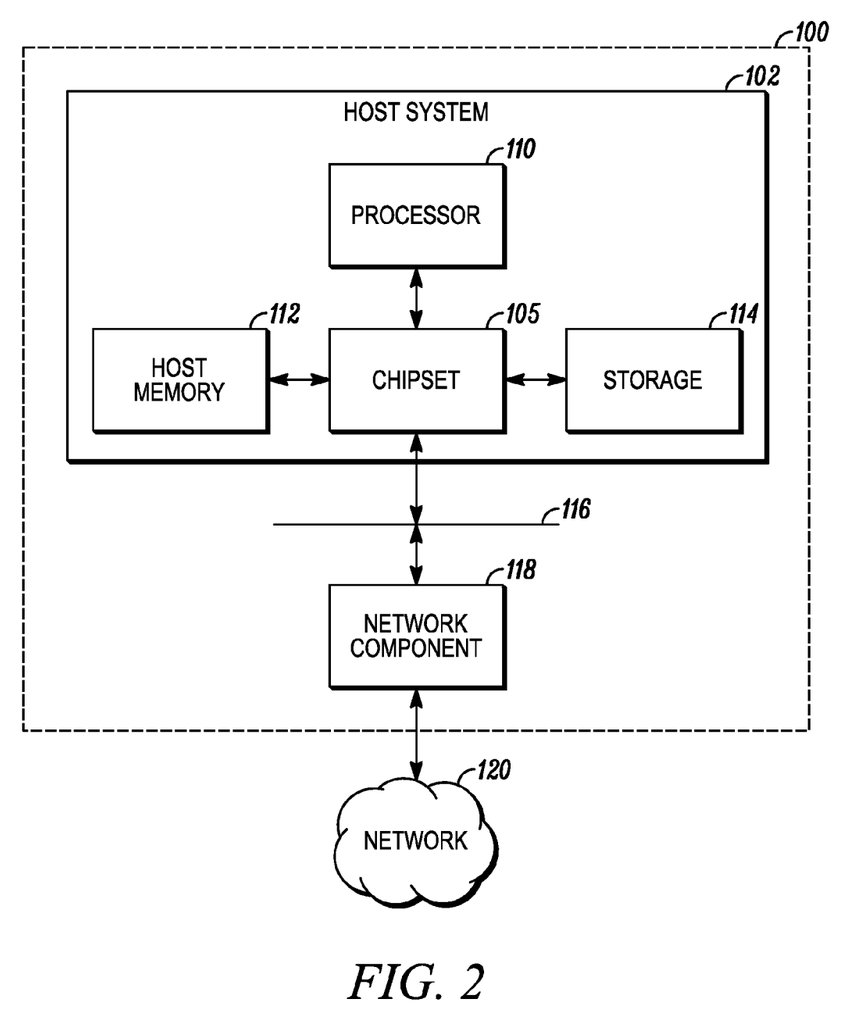
FIG. 2 depicts a suitable system in which some embodiments of the present invention may be used.

FIG. 2 depicts in computer system 100 a suitable system in which some embodiments of the present invention may be used. Computer system 100 may include host system 102, bus 116, and network component 118. Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance at least with any of the following protocols: Small Computer Systems Interface (SCSI), Fibre Channel (FC), and/or Serial Advanced Technology Attachment (S-ATA).

In accordance with some embodiments of the present invention, storage 114 may include a holographic storage device. In some embodiments, the holographic storage device may have the capability to write-to multiple regions of a storage medium simultaneously or at least overlapping in time. In some embodiments, the holographic storage device may have the capability to read-from multiple regions of a storage medium simultaneously or at least overlapping in time. In some embodiments, the holographic storage device may have the capability to read-from multiple regions of a storage medium and write-to multiple regions of the storage medium simultaneously or at least overlapping in time. For example, the holographic storage device may store information provided from a network through network component 118, however the holographic storage device may store information from other sources. System 100 can be coupled to a network and provide storage capabilities to one or more other networked device.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up synchronous DRAM (SDRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance at least with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more packets to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

Network 120 may be any network such as the Internet, an intranet, a local area network (LAN), storage area network (SAN), a wide area network (WAN), or wireless network. Network 120 may exchange traffic with network component 118 using the Ethernet standard (described in IEEE 802.3 and related standards) or any communications standard. As used herein, a "network protocol unit" may include any packet or frame or other format of information with a header and payload portions formed in accordance with any protocol specification. For example, network protocol units can be used to provide information to be written to a holographic storage device. For example, network protocol units can be used to transfer information read from a holographic storage device.

Figure 3:
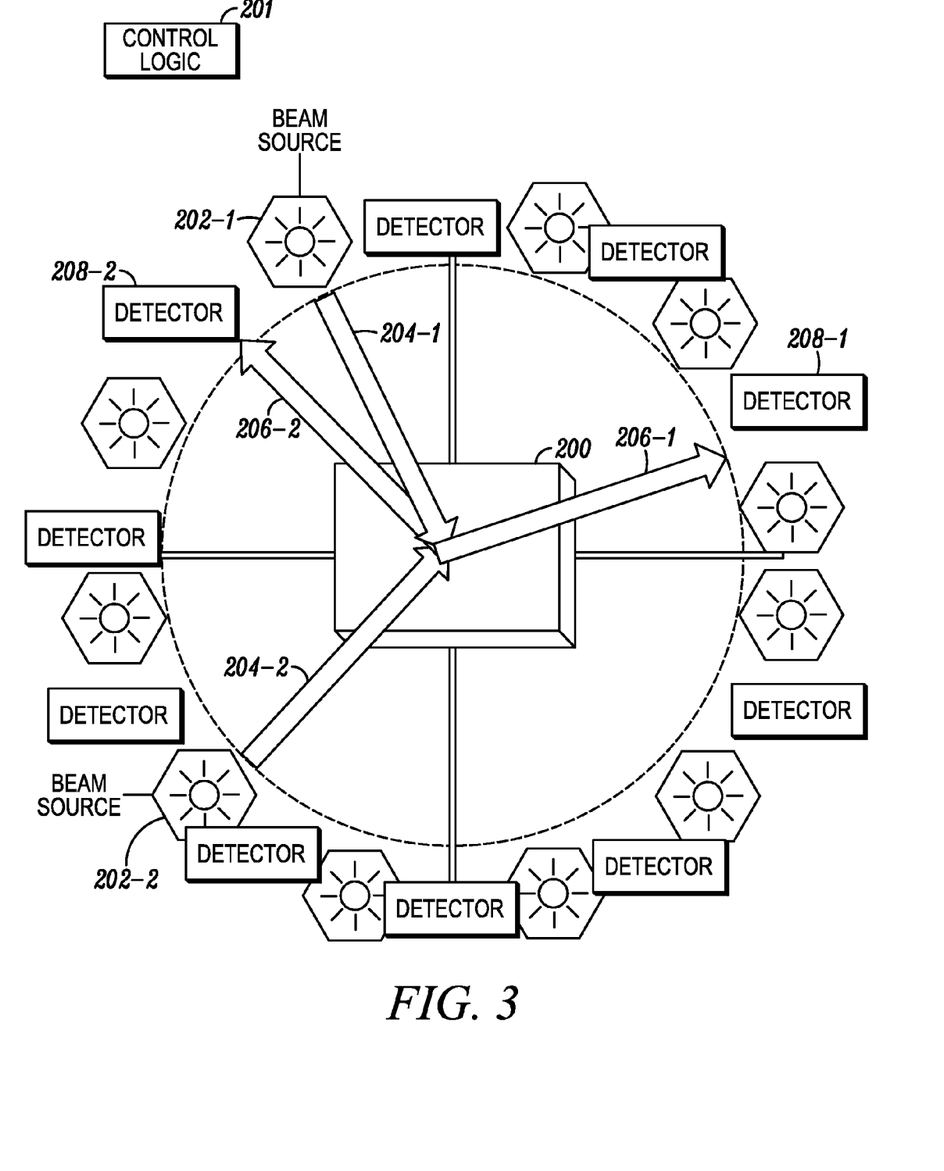
FIGS. 3 and 4 depict holographic storage systems in accordance with some embodiments of the present invention.
Figure 4:
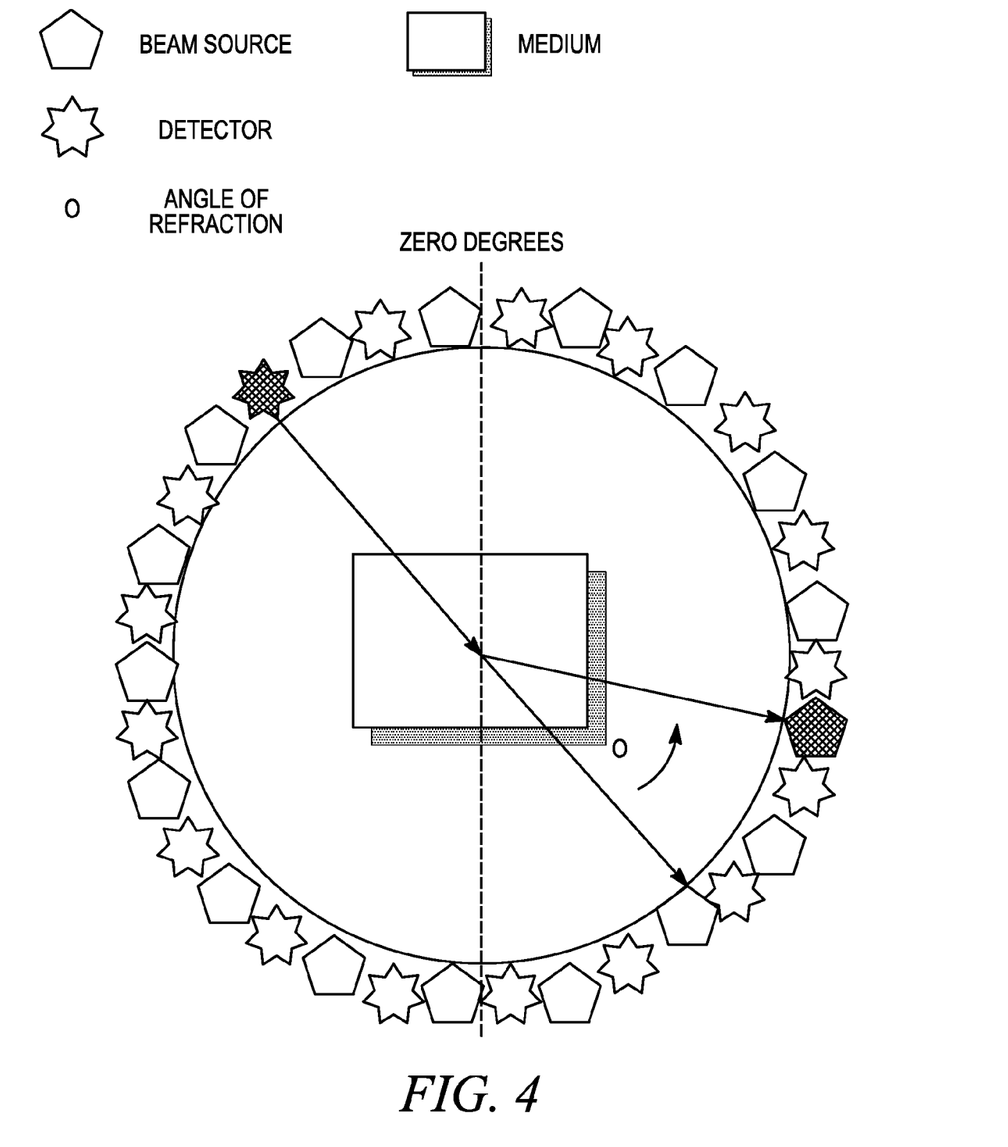

FIGS. 3 and 4 depict holographic storage systems in accordance with some embodiments of the present invention. With reference to FIG. 3, the holographic storage system may include storage medium 200, control logic 201, at least two beam sources 202-1 to 202-2, and at least two detectors 208-1 and 208-2. FIG. 3 depicts eleven beam sources and eleven detectors, but fewer or more numbers of beam sources and detectors may be used. For the sake of simplicity, use of only two beam sources and detectors are described.

In some embodiments, for read/write operations, control logic 201 indicates a region on medium 200 at which each beam source is to aim a beam. Control logic 201 may store an address table that indicates two dimensional regions on medium 200 that store addressable data. The address table can be used to associate a file name with a physical location on medium 200. The address table may be stored on a hard disk or other type of storage medium or memory device. In some embodiments, this address can be given as any of an angle and/or location on medium 200. For example, an operating system executed by a host system may request the location of a specific file in the holographic system from the address table. The operating system may request the system of FIG. 3 to retrieve content from the address.

A beam source capable to emit a beam to a specified angle and/or location can be activated to emit a beam to medium 200. For example, beam source 202-1 may emit light beam 204-1 directed towards a specific region of storage medium 200. Light beam 204-1 may be a laser beam that is a single wavelength or color and emitted in a narrow beam. Beam 204-1 may be directed to one or more region on storage medium 200 to record information on storage medium 200. The beam may be directed to one or more region on storage medium 200 to read information stored on storage medium 200.

For example, positioning incident beams onto a region of medium 200 may take place in part using mechanical movement of mirrors or lenses. For example, positioning incident beams onto a region of medium 200 may take place in part by moving or rotating medium 200 relative to one or more fixed position laser beam.

Storage medium 200 may be capable to store one or more image written by incident light. Storage medium 200 may be any medium that is capable to store a spatial distribution of areas with high and low light intensity (so called "interference pattern"). In some embodiments, storage medium 200 may store a hologram. Holograms are useful for storing images of three dimensional objects. The phase of the light gives an impression of a three dimensional object. However, the amplitude of the light wave or the laser can also give the illusion of three dimensions. The medium may store amplitude and/or phase. The medium may have properties that react to bright spots in the incident beam. Different types or substances of mediums react differently to incident light. Some mediums are more plastic and they contract or expand according to the phase of light. Others change their refraction properties according to which phase of light hits it. Some increase polymerization on these areas. For example, in response to incident light, an interference pattern may be recorded by a selective polymerization within medium 200. Different substances have different storage resolutions. The higher the resolution, the more bits of data can be stored in a smaller volume. For example, medium 200 may have a recording density at least of 350 gigabits/in$^2$.

For example, medium 200 may be implemented at least as photorefractive crystals or photopolymer layers to store information. For example, medium 200 may be implemented as one or more LiNbO$_3$ photorefractive crystal. When two coherent light beams are superimposed in a photorefractive crystal, an interference pattern results, i.e., a spatial distribution of areas with high and low light intensity inside the crystal. A photopolymer is a material that undergoes light-induced polymerization. A photopolymer can be made from a gel based composition that is photo-reactive. Two laser beams intersecting in the gel may set up an interference pattern, which causes selective polymerization within the material.

To record information on medium 200, beams from one or more beam source may be directed to a region on medium 200. An interference pattern may be formed at the region by the intersection of the beams. A single source may provide a single beam. A single beam may be split into two. The splitting of the beam into two beams can be accomplished in many ways. For example, a beam splitter may be used. Lenses, mirrors, physical separators or other methods may be used to split a beam. When a laser beam is split in two beams, one is directed towards the medium. The beam directed towards the medium is called the reference beam. The reference beam holds the original state of the beam. The second beam is directed towards the object (or visible information). After the second beam hits the object, parts of the beam have different phases according to where the beam hit the object. This second beam is directed into the photographic plate. When both beams hit the plate, interference occurs, and peaks and valleys in the light wave get overemphasized. Some mediums change properties according to these peaks and valleys and store a hologram according to the peaks and valleys. This contrasts in the interferences from both beams cause different types of reactions in the medium. Interference of both beams may cause the information to be stored. Multiple holograms can be stored on the same medium by changing the input angle of incident beams used when recording.

To read information from medium 200, light beam 204-1 may be emitted toward a region of storage medium 200 and a beam reflected from the region (such reflected beam is shown as beam 206-1). Reflected beam 206-1 may be read by detector 208-1. Information stored on medium 200 may affect properties of reflected beam 206-1. When light is reflected by medium 200, if the polarization of the light is not rotated, it is a "white" image, and if the polarization of the light is rotated, it is a "black" image. "White" and "black" images may represent different binary states.

A beam refracted from medium 200 contains peaks and valleys stored previously as a hologram. A beam produced from reflection of beam 204-1 from medium 200 is shown as beam 206-1. In this example, beam 206-1 may reflect at approximately 90 degrees from incident beam 204-1. Beams that record the hologram and the beams used read the medium can be the same. However, in order to read the hologram, only the reference beam is used. The reference beam has the same wavelength and amplitude as the original beam used to record the hologram. When reading from a region, the beam source selected may emit a reference beam at the same angle used to write.

Detector 208-1 may receive beam 206-1. In this example, detector 208-1 may be positioned at approximately 90 degrees from beam source 202-1 and within the same plane. However, the angle between beam source 202-1 and detector 208-1 may depend on the angle of refraction of medium 200. The angle of reflection can be set by the refractive properties of medium 200 as well as mechanical or optical devices. For example, FIG. 4 depicts an example where a beam from a beam source is refracted at an angle O such that a detector 180-O degrees (counter clock-wise) relative to the beam source is used to detect the refracted beam. One or more detector can be moved by mechanically to receive one or more reflected beam.

Referring again to FIG. 3, detector 208-1 may include logic capable to convert reflected beam 206-1 into digital information. Detector 208-1 may include a light sensor that is sensitive enough to distinguish between "bright" and "dark" spots. For example, a bright spot may give a digital signal of "on" which means digital value of one whereas a dark spot could be in an "off" position, so this will communicate a digital value of zero. For example, for a read operation, detector 208-1 may detect an interference pattern measured by reflected beam 206-1. Based in part on the light and dark properties of the interference pattern, detector 208-1 may provide data.

In some embodiments, two or more beam sources (e.g., 202-1 and 202-2) may emit beams directed to one or more region of medium 200 simultaneously or at least overlapping in time. Accordingly, multiple portions of information can be read simultaneously and/or multiple portions of information can be written simultaneously. In some embodiments, although not a necessary feature of any embodiment, use of parallel reading is made without the mechanical movement of medium 200 such as mechanical spinning or rotation. For example, if information is to be written-to/read-from using a beam incident at X degrees, the light emitter placed at X degrees will emit the reference beam into the medium, and a light sensor positioned at the corresponding refraction angle reads that information without the need to turn or move the medium.

Accordingly, multiple devices can simultaneously, or at least overlapping in time, read/write using the same medium. Multiple devices can include but are not limited to networked devices, central processing units, and logical cores. For example, two reads could happen at the same time because one light emitter could be sending the reference beam at 40 degrees while another one is sending the reference beam at 70 degrees, and the corresponding light sensors will read the right information at the expected angles without the need for serial reads or the need to spin/move the medium to read more than one location.

In some embodiments, a detector can read refracted beams from multiple detectors. In some embodiments, M detectors can read refracted beams from N beam sources, where M and N are $\geq 1$. In some embodiments, at least one beam source and detector can be placed in a three dimensional geometry around the medium.

For example, some factors used determine how many beams sources and detectors are used can include quality of the beam sources, size of region that can be shined upon by a beam source, size of region detectable by a detector, and size of the medium. Diffraction is a phenomenon that occurs in waves that makes them spread to the sides of the direction where it was sent. As in a flashlight, the area illuminated by the flashlight is bigger than the opening of the flashlight because the light diffracted and the waves expanded outside the area where the beam was directed. This may cause other light sensors to be illuminated that are not in the refraction angle, thereby decreasing signal-to-noise ratio or decreasing the quality and accuracy of the reads. This factor is important because if the light beam does not suffer much diffraction, it will increase the accuracy of simultaneous reads because one beam does not interfere with another one. Logic can be used to decrease the amount of diffraction the laser beam suffers. The bigger the size of the medium, the more beam sources and detectors can be used. The smaller the detectors and the beam sources, the more can be used.

Figure 5:
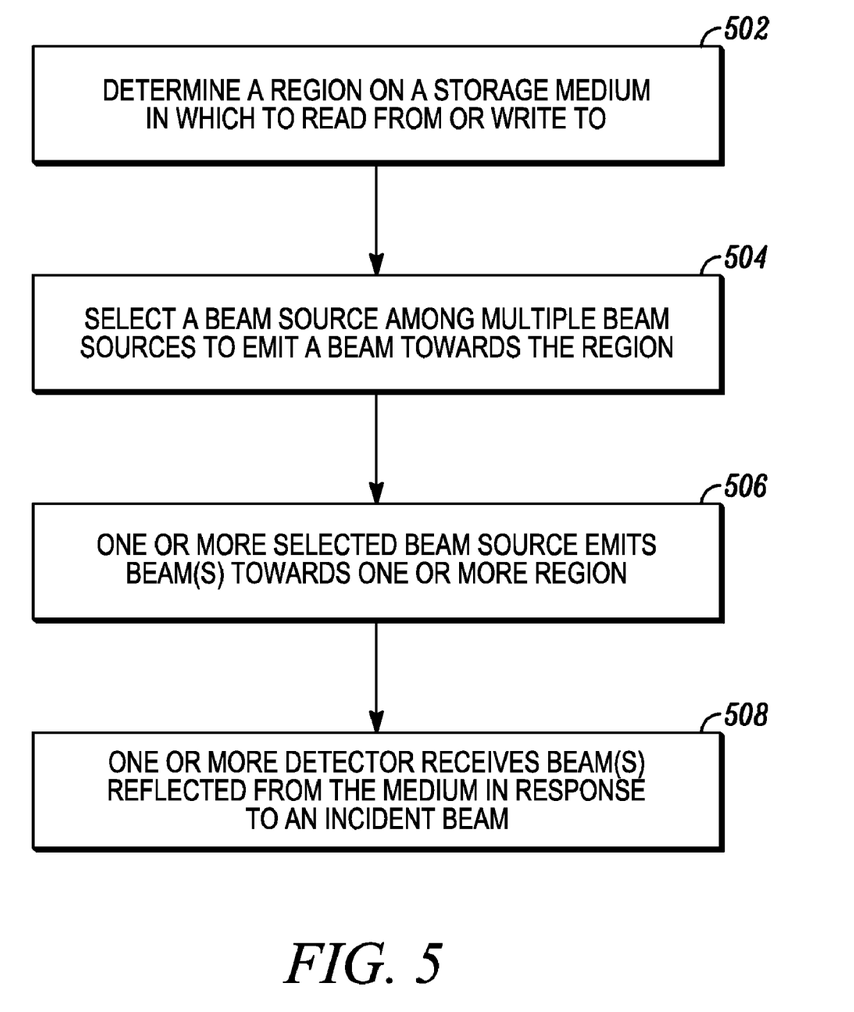
FIG. 5 depicts a suitable process in accordance with some embodiments of the present invention.

FIG. 5 depicts a suitable process in accordance with some embodiments of the present invention. Block 502 may include determining a region on a storage medium in which to read-from or write-to. The storage medium may be a medium capable of storing interference patterns. The storage medium may store one or more holographic image. The region may be identified by angle of incident beam and/or location on the medium.

Block 504 may include selecting a beam source among multiple beam sources to emit a beam towards the region. For example, the emitted beam may be used to read from the region. For example, the emitted beam may be used to write to the region. For example, a beam source may be selected based on its ability to emit a beam towards the desired region. For example, a beam source capable to emit a beam at approximately the desired incident angle relative to the medium may be selected. In some scenarios, the selected beam source is positioned in a manner that it is more readily able to emit a beam towards the desired region than other beam sources.

Block 506 may include one or more selected beam source emitting beams towards one or more region. For example, one of the beams may be emitted to read-from or write-to a first region whereas another of the beams may be used to read-from or write-to a second region.

Block 508 may include one or more detector receiving a beam reflected from the medium in response to an incident beam. Block 508 may be used to read information from the medium. Multiple detectors may substantially at the same time receive beams reflected from different regions of the medium. Accordingly, information from multiple regions may be read substantially simultaneously. A detector may be associated with a beam source and be known to receive a beam for a requested read.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:
   a storage medium capable of storing bits based on one or more properties of at least one incident light beam;
   at least two beam sources, each beam source to emit a beam towards the storage medium;
   at least two detectors, wherein each detector is offset from at least one beam source at an angle of refraction and is capable to receive a beam reflected from the medium in response to an incident beam; and
   control logic to receive a file request and to identify which of the at least two beam sources is to emit a beam towards the medium, wherein the received file request is associated with a region on the storage medium and wherein the region is associated with an angle and location on the medium.

2. The apparatus of claim 1, wherein the storage medium is to store an interference pattern in response to an incident light beam.

3. The apparatus of claim 1, wherein the identified beam source is selected based on capability to emit a beam at the angle.

4. The apparatus of claim 1, wherein at least two operations of reading from the medium are capable of execution substantially overlapping in time.

5. The apparatus of claim 1, wherein at least two operations of writing to the medium are capable of execution substantially overlapping in time.

6. The apparatus of claim 1, wherein at least read and write operations are capable of execution substantially overlapping in time.

7. The apparatus of claim 1, further comprising a device to move an identified beam source in order for a beam from the beam source to impact a desired region of the medium.

8. The apparatus of claim 7, further comprising a second device to move a selected detector in order for a beam reflected from the medium to impact the selected detector.

9. The apparatus of claim 1, wherein the at least two beam sources and at least two detectors are positioned within a same plane.

10. A method comprising:
    providing a storage medium capable of storing bits based on one or more properties of an incident light beam;
    providing at least two beam sources, each beam source is capable to emit a beam towards the storage medium;
    providing at least two detectors, wherein each detector is offset from at least one beam source at an angle of refraction and is capable to receive a beam reflected from the medium in response to an incident beam; and
    providing control logic to receive a file request and to identify which of the at least two beam sources is to emit a beam towards the medium, wherein the received file request is associated with a region on the storage medium and wherein the region is associated with an angle and location on the medium.

11. The method of claim 10, further comprising positioning the at least two beam sources and at least two detectors within a same plane.

12. The method of claim 10, further comprising providing a device capable to move an identified beam source in order for a beam from the beam source to impact a desired region of the medium.

13. The method of claim 10, further comprising providing a device capable to move a selected detector in order for a beam reflected from the medium to impact the selected detector.

14. The method of claim 10, wherein the storage medium is capable to store an interference pattern in response to an incident light beam.

15. A system comprising:
    a display device;
    a host system communicatively coupled to the display device, the host system comprising:
    a storage device comprising:

a storage medium capable of storing bits based on one or more properties of at least one incident light beam, at least two beam sources, each beam source to emit a beam towards the storage medium, at least two detectors, wherein each detector is offset from at least on beam source at an angle of refraction and is capable to receive a beam reflected from the medium in response to an incident beam; and control logic to receive a file request and to identify which of the at least two beam sources is to emit a beam towards the medium, wherein the received file request is associated with a region on the storage medium and wherein the region is associated with an angle and location on the medium.

16. The system of claim 15, wherein the storage medium is to store an interference pattern in response to an incident light beam.

17. The system of claim 15, wherein the identified beam source is selected based on capability to emit a beam at the angle.

* * * * *